US012439244B2

(12) United States Patent
Vangala et al.

(10) Patent No.: US 12,439,244 B2
(45) Date of Patent: Oct. 7, 2025

(54) SYSTEMS AND METHODS FOR VOLUME PORTING

(71) Applicant: T-Mobile USA, Inc., Bellevue, WA (US)

(72) Inventors: Shivakrishna Vangala, Bellevue, WA (US); Jesus Ochoa, Stanwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 357 days.

(21) Appl. No.: 18/062,761

(22) Filed: Dec. 7, 2022

(65) Prior Publication Data

US 2024/0196204 A1    Jun. 13, 2024

(51) Int. Cl.
*H04W 8/28* (2009.01)
*H04W 4/24* (2018.01)

(52) U.S. Cl.
CPC ............... *H04W 8/28* (2013.01); *H04W 4/24* (2013.01)

(58) Field of Classification Search
CPC .................................. H04W 8/28; H04W 4/24
USPC .......................................................... 455/406
See application file for complete search history.

(56) References Cited

U.S. PATENT DOCUMENTS

2019/0068781 A1* 2/2019 Barker .................. G06F 3/0482

\* cited by examiner

*Primary Examiner* — Huy C Ho
(74) *Attorney, Agent, or Firm* — Lee & Hayes, P.C.

(57) ABSTRACT

System and methods for porting volumes of telephone numbers in wireless networks are described. A volume porting system may process account data to determine numbers associated with individual account and current and future billing account number data for such numbers. Using this data, the volume porting system may generate porting requests and query a porting operations system for porting status data for such requests. The volume porting system may track and store such data and automatically notify destination network systems and other systems when numbers and/or accounts have been successfully ported.

19 Claims, 8 Drawing Sheets

SYSTEMS AND METHODS FOR VOLUME PORTING

BACKGROUND

The number of wireless communications devices (e.g., user devices such as mobile telephones, smartphones, tablets, laptops, etc.) in use has rapidly grown in recent years. Likewise, the number of networks and operators that support such devices has also increased greatly. With the proliferation of devices and networks, migrations of larger numbers of users and their associated devices and data have become more common. For example, a first network operator may acquire a second network operator and migrate all of the devices and customer utilizing the second operator's network to the first operator's network. Because porting systems and techniques currently in use are primarily intended for addressing individual user migrations between networks (e.g., when an individual customer moves from one provider to another), it can be challenging to efficiently port large numbers of devices between networks and/or operators.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
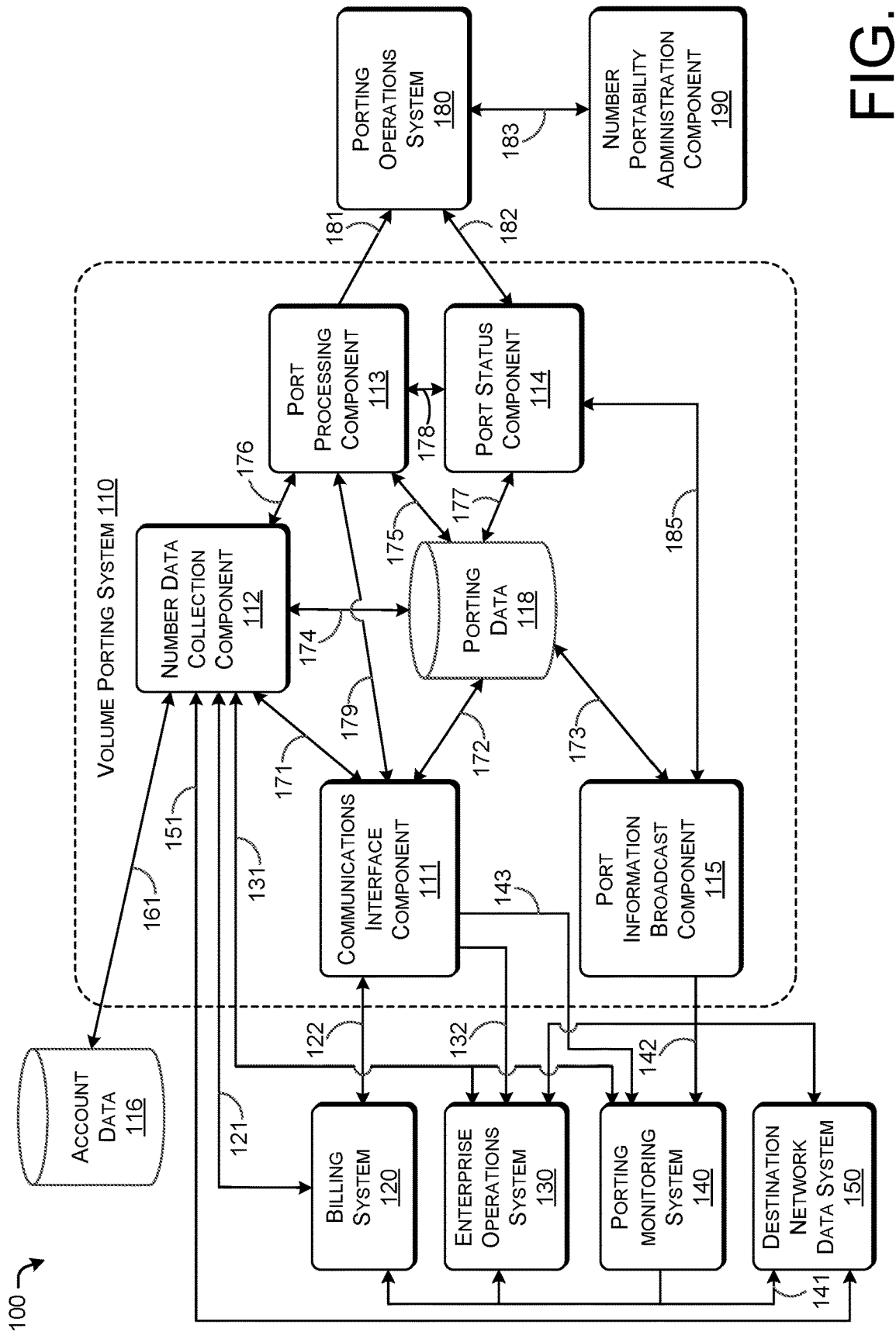
FIG. 1 is a schematic diagram of an illustrative volume porting environment in which systems and methods for volume porting may be implemented, in accordance with examples of the disclosure.

This disclosure is directed in part to systems and techniques for performing for volume telephone number and number data porting in wireless communications networks and other networks that provide communications services to wireless communications devices. Such networks may include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system that may provide communications services to user devices using any protocol. The disclosed systems and techniques may be further applicable to any system that may facilitate the porting of a user, user device, and/or user data from one network to another network.

Data associated with a user and/or user device may be represented in or otherwise associated with a wireless communications account. Such an account may include or may be associated with one or more telephone numbers, addresses, and/or other identifiers that may be used to facilitate voice and/or data communications. These telephone numbers, addresses, and identifiers may be referred to herein generally as "telephone numbers" or simply "numbers." An account and/or one or more numbers associated therewith may be associated with a primary network operated by a network operator. This network operator may be the primary service provider for the account and/or associated numbers and may bill the associated customer, maintain account and/or service configurations, user preferences, etc. Other networks may direct traffic for the numbers associated with the account to primary service provider's network based on routing configurations that may be made available to such networks by the primary service provider.

Number portability features of modern telecommunications systems allow for a particular number to change primary networks, e.g., to be moved from one primary network to another. The movement of a number from one primary network to another may be referred to as being "ported" from one network to another network. The networks between which a numbers may be ported may be co-owned by a same network operator or operated by different operators. Some such networks may or may not implement similar communications technologies, standards, protocols, etc.

In many examples, numbers are ported individually, for example in response to a user request. For instance, a user may decide to change service providers but may wish to retain the same telephone number. In response to this request, the operators of the user's current primary network and the user's future primary network may coordinate activities to transfer and/or update data in both networks and across intercommunicating networks to reflect that the user's number is now associated with a new primary network (the user's future primary network). The operator of the new primary network may assume billing responsibilities, update service records, etc., while the former primary network operator may update its records and adjust data as needed to cease performing such functions for the user. This porting process may include transferring account data for the user as well as any other associated data from the former primary network operator to the new primary network operator. This may be a largely manual process as each operator may need to collect and update the data associated for an individual customer associated with the number being ported and perform confirmation actions to ensure that the requested porting is legitimate.

In some examples, one or more operators may wish to port large batches of accounts and/or associated numbers may be ported between two networks. This may be due to the acquisition or sale of a network and/or its customers by one operator to another. In other examples, two or more operators may merge and the new single entity may wish to move all customers to a single primary network. In such situations, the individual number porting mechanisms commonly used for porting individual numbers may be not provide efficient means of porting large volumes of numbers.

The systems and techniques for performing for volume number porting described herein may facilitate the efficient porting of large quantities of numbers from one network to another. In various examples, a volume porting system may be used to implement volume number porting. A volume porting system may be configured with one or more components that may perform various aspects of volume number porting operations. Each such component may be implemented as electronic hardware, computer software, or combinations of both. For example, any component described herein may be implemented in a dedicated server or other computing device or as a virtual machine executed in a cloud computing environment. Any component or system described herein may interact with any other component or system described herein via any type of communications means, including wired communications means, wireless communications means, via the Internet, via one or more intranets, etc. Any subset of the components and systems described herein may be co-located in a single location and/or within a single system (e.g., server).

A volume porting system may interact with a network or enterprise operations system that may receive and/or generate requests to port one or more accounts and/or numbers. The volume porting system may poll or query (e.g., periodically and/or in response to a user instruction) the operations system for events that indicate a request to port accounts/numbers. Alternatively or additionally, a network or enterprise operations system may transmit a request to port one or more accounts and/or numbers to the volume porting system.

In response to detecting a porting event, the volume porting system may identify the numbers and/or accounts to be ported, for example, based on data associated with the detection event. In examples, the volume porting system may query account data at an account data store, such as a billing system and/or other system storing current account data for the accounts associated with the porting event. For instance, the volume porting system may obtain billing account number (BAN) data for the accounts associated with the porting event. This information may include number data beyond telephone numbers that may be required for successful porting of numbers. For example, BAN data may include one or more current service profile identifiers (SPIDs), local routing numbers (LRNs), and/or other attributes and/or number data that may be currently associated with an account and/or number and that may be used to successfully port a number from one network to another.

The volume porting system may also determine other porting information that may be needed to complete porting of the numbers and/or accounts associated with the porting event. For example, the volume porting system may query a destination network operations system (e.g., a system associated with the "new" network to which the account and/or numbers are to be ported) for future number data to be configured for the number(s) to be ported. For instance, the volume porting system may request one or more ported (new) SPIDs, LRNs, or other ported (future) BAN data that is to be associated with the ported number(s) in the porting process.

Using this determined current and future number data, the volume porting system may determine the number data to be included in a porting request. For example, the volume porting system may determine, as payload for a porting request, the telephone number, current and future SPID, LRNs, telephone number ranges, etc. that may be used by a porting operations system for porting a number between networks. The volume porting system may generate and transmit a porting request including this payload to the porting operations system for each number to be ported. This porting operations system may be external to either the current or destination network associated with the telephone number to be ported or a system associated with one or both such networks. In examples, a porting event may be associated with a particular account that may have multiple telephone numbers associated with it. In such examples, the volume porting system may generate and transmit a porting request for each such telephone number.

A porting operations system may not be configured or capable of proactively providing a response to porting request. Therefore, the volume porting system may query the porting operations system to determine the status of requested ports. The volume porting system may perform this query periodically (e.g., once an hour, once a day, etc.) and/or following a time period after each porting request (e.g., ten minutes or an hour after the request was submitted). The volume porting system may evaluate the responses received to determine the status of the port requested. If the porting for a particular number was successful, the volume porting system may transmit a notification to a destination network system indicating that the porting was successful and providing the new, updated number data for the number. The destination network system may then perform any actions needed to implement and/or provide services for that number.

If the porting was not successful or is still in progress (e.g., as indicated by the response received from the porting operations system), the volume porting system may query the porting operations system again at a later time, waiting to report porting success to the destination network until it has been confirmed. If the porting failed, as reported by the porting operations system, the volume porting system may not notify the destination network as there is no successful porting for the destination network to address for the associated number.

Based on responses to query of the porting operations system, the volume porting system may determine whether all numbers associated a particular account with have been successfully ported. If so, the volume porting system may transmit a notification to its associated network or enterprise operations system (e.g., that originated the porting event) indicating that the particular account has been fully ported. If there are remaining numbers associated with the particular account that have not been successfully ported, the volume porting system may not notify the operations system or may notify the operations system that the porting of the account has not been successful.

The volume porting system may track the activities performed in the volume porting process and/or generate a notification indicating the performance and/or results of performing such activities. For example, the volume porting process may notify a porting monitoring system and/or its associated operations system of generated and transmitted requests (e.g., BAN data requests, porting requests, porting status requests, etc.) and/or received responses to such requests. The porting monitoring system and/or the operations system may then aggregate such information to generate one or more user interfaces that may be presented to one or more users (e.g., in a web browser) to facilitate monitoring of the volume porting process.

The volume porting system may include a telephone number data collection component, a port processing component, a port status component, a port information broadcast component, a communications interface component, and/or a porting data store component. These components may communication (e.g., directly or indirectly) with one another to perform the activities of the volume porting process. In some examples, the components may transmit porting data (e.g., number data, port status data, etc.) to one another. In other examples, the components of the volume porting system may store data at the porting data store component for retrieval by one or more other components of the volume porting system.

The telephone number data collection component (may be referred to as a "number data collection component") may be configured to determine number data in response to detecting a porting event. For example, the number data collection component may detect or receive a porting event associated with one or more user accounts. The number data collection component may determine one or more numbers associated with such an account from an account data source (billing system, operations system, etc.). The number data collection component may determine, using these one or more numbers, the number data associated with the account and the numbers that may be needed to perform a porting operation for the number(s). For example, the number data collection component may query the account data source for current number data for the number(s) and a destination operator network system for future (e.g., porting destination network) number data. The number data collection component may store this data on the porting data store component and/or provide this data to the port processing component. The number data collection component may also, or instead, notify the port processing component that number data for an account and/or number that is to be ported has been stored at the porting data store component. The number data collection component may also, or instead, notify a porting monitoring system and/or an operations system associated with the volume porting system that the number data collection has been initiated, successfully completed, and/or failed.

The port processing component may be configured to use the number data collected by the number data collection component to generate a porting request payload and an associated porting request. The port processing component may determine the relevant number data from the porting data store component and/or from data received from the number data collection component. In some examples, the port processing component may generate a request for individual numbers with corresponding payloads, while in other examples, the port processing component may generate a request that requests the porting of more than one telephone number and provides the applicable data for the numbers in its payload. The port processing component may transmit the porting request(s) to the porting operations system that may initiate the porting process for the number(s) represented in the request. The port processing component may also, or instead, store porting request data at the porting data store component and/or notify the port status component that the porting request(s) have been sent. The port processing component may also, or instead, notify the porting monitoring system and/or the operations system associated with the volume porting system that the porting request(s) has been generated and/or transmitted.

The port status component may be configured to query the porting operations system for port statuses, for example, based on data associated with porting requests received from the port processing component or retrieved from the porting data store component. The port status component may generate status queries for particular porting request (e.g., identifying one or more numbers for which porting was requested) and/or general status queries requesting the status of number ports that have not yet been reported as complete by the porting operations system. The port status component may transmit such queries periodically or in response to conditions (e.g., following the transmission of a porting request). The porting operations system may respond to such queries with a status that may indicate one or more of a variety of conditions, such as "success," "failure," "in progress," "incomplete," "complete," etc. The responses from the porting operations system may include the specific telephone number associated with the status and/or other data that may be used to determine the number(s) associated with the status. The port status component may also, or instead, store porting status data at the porting data store component and/or notify the port information broadcast component that the porting statuses have been received. The port status component may also, or instead, notify the porting monitoring system and/or the operations system associated with the volume porting system that one or more port status queries have been generated and/or transmitted and/or the responses received to such queries.

The port information broadcast component may be configured to determine whether other systems (e.g., external to and/or distinct from the volume porting system) may be notified about a porting status, for example, based on data associated with porting statuses received from the port status component or retrieved from the porting data store component. In examples, the port information broadcast component may determine that all numbers associated with a particular account have been successfully ported and may, in response, generate and transmit a notification of the successful account porting to an operations system, monitoring system, and/or a destination operations system. In other examples, the port information broadcast component may determine that a particular number has been successfully ported and may, in response, generate and transmit a notification of the successful number porting to an operations system, monitoring system, and/or a destination operations system. The notifications of successful porting may include number data, such as new (e.g., now current and associated with the destination network) number data that will allow traffic for the number to be routed to the new destination network. This information may also be propagated across other interconnected networks so that traffic may be routed to the number via the new destination network. The port information broadcast component may also, or instead, transmit notifications of completed and failed porting operations for particular numbers and/or accounts to an operations system, monitoring system, and/or a destination operations system.

The communications interface component may be configured to provide or otherwise facilitate communications with systems and components outside of the volume porting system. For example, the communications interface component may communicate with one or more external systems on behalf of (e.g., in response to communications requests received from) the number data collection component, the port processing component, the port status component, and/or the port information broadcast component, for example using application programing interfaces (APIs). Alternatively or additionally, the communications interface component may provide data that may facilitate communications between the components of the volume porting system and other systems (e.g., APIs from a library at the communications interface component).

The porting data store component may be a data store, data grid, database, and/or other data storage means that may store data structures that may be accessible by the components of the volume porting system and may be used to exchange information between such components. These and other components and systems associated with a volume porting system are described below in more detail.

By facilitating volume porting operations and processes, the systems and methods described herein provide more efficient and accurate porting of volumes of numbers and accounts with reduced resource utilization. By minimizing or eliminating the manual aspects of the porting process and enabling the automated porting of a large quantity of numbers and/or accounts between networks, the systems and methods described herein can improve the performance and increase the efficiency of both networks and associated resources. For example, the methods and systems described herein may be more efficient and/or more robust than conventional techniques, as they may reduce the wasting of resources on manual porting processes and increase the accuracy of porting attempts by automated the collection of number data needed to successfully complete porting operations. That is, the methods and systems described herein provide a technological improvement over existing porting systems and processes by facilitating improved number data accuracy and increasing network and porting efficiency by increasing the success of initial porting attempts, thereby reducing the traffic associated with failed porting attempts and repeated follow up porting requests. In addition to improving the efficiency of network and device resource utilization, the systems and methods described herein can provide more robust systems by, for example, ensuring all needed data is collected and accurate before requesting a porting operation, thereby reducing unnecessary and/or unproductive device and network signaling and processing associated with incomplete or inaccurate porting requests, freeing network and device resources for more productive operations.

Furthermore, the systems and methods for facilitating volume porting operations and processes described herein enable to porting of volumes of customer telephone numbers in much shorter times, in examples in real-time or near real-time. Thus, the disclosed systems and methods enable the porting of customer telephone numbers with little or no disruption of service for the associated customers. Because the described volume porting techniques can be implemented within a single wireless network operations environment, much, if not all, of the signaling typically generated across providers and/or between billing systems operated by different providers in porting operations may be eliminated, thereby reducing the utilization of processing and network resources. The described volume porting techniques may also reduce or eliminate entirely the need to perform wireless local number portability operations for multiple billers and/or the use of third-party systems that may be intermediaries in typical porting operations. Since such third-party and intermediate systems may serve as bottlenecks in volume porting operations, by reducing or eliminating the impact of such systems, the disclosed systems and methods may even further reduce the processing and network resources used in volume porting operations and increase the efficiency and speed of performing operations. Additionally, the disclosed systems and methods for volume porting may help avoid many of the standard porting requirements and restrictions that are typically applicable in porting operations because the disclosed systems and methods may be performed within a single wireless network operations environment.

Illustrative environments, signal flows, and techniques for implementing systems and methods for volume porting are described below. However, the described systems and techniques may be implemented in other environments.

Illustrative System Architecture

FIG. 1 is a schematic diagram of an illustrative wireless network operations environment 100 in which the disclosed systems and techniques may be implemented. The environment 100 may include a volume porting system 110 that may wirelessly communicate with one or more systems and components within the environment 100 and/or external to the environment 100. Such communications may be facilitated by any one or more wired and/or wireless networks that may provide communicative connectivity between particular devices, components, and/or functions of various types in a wireless network operations environment and with other devices components, and/or functions of various types outside of such an environment. Various connections between components, systems, and functions in the environment 110 may be wired, wireless, or a combination thereof. The components systems, and functions described herein may be implemented as physical devices, as software components executing on one or more computing devices, or any combination thereof. In various embodiments, the volume porting system 110 may facilitate the porting of one or more numbers and/or accounts from one network to another. In examples, the volume porting system 110 may facilitate the porting of quantities of numbers and/or accounts associated with wireless communications devices from a first wireless communications network to second, distinct wireless communications network. The volume porting system 110 may be one or more network computing devices operating in a wireless communication network environment. In FIG. 1, communications links and connections between components and systems may be logical communications connections facilitated by one or more wired and/or wireless connections and may include traversal of one or more devices, components, systems, and/or functions (not shown in FIG. 1).

In environment 100, the volume porting system 110 (e.g., particular components configured therein), may interact with a variety of other systems and components to implement volume porting. For example, and as described in more detail below, the volume porting system 110 may interact with an account data store component 116 that may store account data for customers or users. This may be current, pre-porting account data for these customers or users. The volume porting system 110 may also, or instead, interact with a billing system 120 that may be a billing system associated with the destination network to which accounts and/or numbers are to be ported and that will be used to bill the customer for service on the destination network. The enterprise operations system 130 may also interact with the volume porting system 110 and may represent the destination network enterprise operations that may coordinate network activities, including porting volumes of numbers and/ or accounts. The porting monitoring system 140 may also interact with the volume porting system 110 and may provide porting data collection and monitoring services, storing and aggregating porting data for presentation to users or operators on one or more user interfaces. The destination network data system 140 may also interact with the volume porting system 110 and may store and provide network configuration data, number data, and account data for use by numbers and/or accounts after they are ported to the destination network (e.g., new or updated configuration data for use after porting).

The volume porting system 110 may also, or instead, interact with a porting operations system 180 that may be configured to port individual numbers between networks. The porting operations system 180 may perform number data adjustments and reassignments, etc. required to port an individual number from one network to another. The porting operations system 180 interact with a number portability administration component 190 that may update information for ported numbers across interconnected networks so that traffic may be appropriately directed to new destination networks for ported numbers.

The volume porting system 110 may include a number data collection component 112 that may be configured to determine number data in response to detecting a porting event. For example, the number data collection component 112 may poll (e.g., at regular intervals and/or in response to one or more conditions) the enterprise operations system 130 via communications link 131 for porting events. Alternatively or additionally, the enterprise operations system 130 may transmit a notification and/or instruction indicating a porting event to the number data collection component 112 via communications link 131. In various examples, communication between the number data collection component 112 and the enterprise operations system 130 may be facilitated via one or more APIs configured at one or both of the number data collection component 112 and the enterprise operations system 130. Alternatively or additionally, communication between the number data collection component 112 and the enterprise operations system 130 may be facilitated by the communications interface component 111 that may be configured to communicate with systems and/or components external to the volume porting system 110 on behalf of one or more components of the volume porting system 110. For example, the number data collection component 112 may request or instruct the communications interface component 111 via communications link 171 to transmit and/or relay communications between it and the enterprise operations system 130.

The enterprise operations system 130 may generate or otherwise indicate a porting event that may be detected by the number data collection component 112 as described above. A porting event may indicate one or more accounts and/or numbers to be ported. A porting event may also indicate data indicating attributes of the porting to be performed, such as a current network and a destination network associated with the porting. A porting event may include such data and/or may include indications of such data (e.g., data identifiers, pointers, porting order numbers, etc.) that may be used to determine and/or retrieve porting data associated with the porting event.

In various examples, a porting event may indicate a set of accounts and/or numbers to be ported. For example, a porting event may indicate a relatively large volume (e.g., 100, 1,000, 10,000, etc.) of accounts to be ported. The number data collection component 112 may identify these accounts based on this porting event an initiate the porting operations necessary to port the numbers associated with these accounts from their current primary network to a destination (e.g., new primary) network as described herein.

For example, the number data collection component 112 may query an account data store 116 via communications link 161 for additional information associated with the account(s) indicated by the porting event. This query and the associated results may be implemented using one or more APIs and/or facilitated by the communications interface component 111. The account information retrieved from the account data store 116 may be current or legacy (pre-porting) account data associated with the account(s). For example, the number data collection component 112 may determine one or more numbers associated with an account based on responsive data provided by the account data store 116. The number data collection component 112 may also, or instead, determine other information associated with an account from data retrieved from the account data store 116, such as quality and/or level of service data, BAN data (e.g., one or more SPIDs, LRNs, any other type of BAN data), and/or any other attributes and/or number data that may be currently associated with an account.

In various examples, the number data collection component 112 may also determine, for examples using one or more numbers associated with an account and determined based on data received from the account data store 116, number data associated to be associated with the account after porting. For example, the number data collection component 112 may query the destination network data system 150 for future (e.g., porting destination network) number data, such as one or more SPIDs, LRNs, etc. This communications may take place via communications link 151 (e.g., using one or more APIs) and/or may be facilitated by the communications interface component 111.

The number data collection component 112 may store the determined number data (e.g., number data for a current and destination network) on the porting data store 118 and/or provide this data to the port processing component 113. For example, the number data collection component 112 may store determined number data for each account indicated in porting event at the porting data store 118 using the communications link 174 and then notify the port processing component 113 via communications link 176 that newly updated number data for numbers to be ported has been stored on the porting data store 118. This notification may include data slowing the port processing component 113 to identify the number data on the porting data store 118. Alternatively or additionally, the number data collection component 112 may transmit the determined number data to the port processing component 113 via the communications link 176.

The number data collection component 112 may notify the porting monitoring system 140 and/or the enterprise operations system 130 of the status of one or more of these number data collection operations. For example, the number data collection component 112 may transmit, via communications link 131, an indication that one or more of the number data determination operations (e.g., determined based on interaction with the account data store 116 and/or the destination network data system 150) have been initiated, successfully completed, and/or failed. The number data collection component 112 may also, or instead, transmit one or more instructions or requests to the communications interface component 111 via communications link 171 that cause the communications interface component 111 to provide such statuses to the porting monitoring system 140 and/or the enterprise operations system 130 via communications links 143 and/or 132, respectively.

The port processing component 113 may, in response to a notification of available number data and/or receipt of number data from the number data collection component 112, use this number data to generate porting requests for the associated numbers that include porting payload data based on the number data. The port processing component 113 may determine the number data from the porting data store 118 using communications link 175 and/or as from data received from the number data collection component 112 via communications link 176. In various examples, the port processing component 113 may generate a port request for each of the individual numbers and configure in each such request a respective payload with associated number data. The port processing component may instead, or in addition, generate an aggregated request that requests the porting of more than one telephone number and provides the applicable number data for each such number in its payload. The port processing component 113 may transmit one or more determined porting requests to the porting operations system 180 via communications links 181, in some examples, using one or more APIs to exchange communications with the porting operations system 180. In other examples, the port processing component 113 may communicate with the porting operations system 180 via the communications interface component 111 (communications links not shown in FIG. 1). The porting operations system 180 may, in response to such port request(s), perform porting actions based on the request payloads to port the numbers to the indicated destination network.

The porting operations system 180 may perform porting operations that may include propagating updated number data for a ported number across other interconnected networks so that traffic may be routed to the number via the new destination network. For example, the porting operations system 180 may communicate with the number portability administration component 190 via communications link 183 to provide and/or request that number data for a ported number be updated to reflect a new primary network associated with the number.

The port processing component 113 may store the determined porting request data at the porting data store 118 via communications link 175 and notify the port status component 114 via communications link 178 that such porting request(s) have been transmitted to the porting operations system 180. Alternatively or additionally, the port processing component 113 may transmit porting request data to the port status component 114 via communications link 178. The port processing component 113 may also, or instead, transmit one or more instructions or requests to the communications interface component 111 via communications link 179 that cause the communications interface component 111 to provide notifications of the porting requests to the porting monitoring system 140 and/or the enterprise operations system 130 via communications links 143 and/or 132, respectively.

The port status component 114 may be configured to query the porting operations system 180 via communications link 182 for port statuses, for example, based on data associated with porting requests received from the port processing component 113 or retrieved from the porting data store 118. In examples, the port status component 114 may generate a port status query based on a particular porting request (e.g., a query of the status of porting of one or more particular numbers) and/or a more general status query requesting the status of recently request ports (e.g., for a particular time period) and/or the status of ports that have not yet been reported as complete by the porting operations system 180.

The port status component 114 may transmit a port status query in response to determining that a porting request has been transmitted to the porting operations system 180 (e.g., by the port processing component 113). For example, the port status component 114 may receive a notification from the port processing component 113 via communications link 178 that a porting request has been transmitted. This notification may include number data associated with the request and/or data the port status component 114 may use to retrieve number data associated with the porting request from the porting data store 118 via the communications link 177. In various examples, the port status component may be configured to wait a predetermined amount of time (e.g., one minute, one hour, etc.) following receipt of such a notification before transmitting an associated port status query to allow the port operations to be completed at the porting operations system 180. Alternatively or additionally, the port status component 114 may store number data associated with notified porting requests and periodically generate port status queries based on such number data or generate port status queries based on receiving a threshold amount of number data, a threshold number of porting request notifications, etc.

The porting operations system 180 may respond to port status queries via communications link 182 with one or more messages that may include a status associated with one or more porting requests (e.g., that may indicate a number or number data associated with one or more porting requests). For instance, a porting status query response may indicate one or more of conditions that may be associated with a particular porting request, such as "success," "failure," "in progress," "incomplete," "complete," etc. The port status component 144 may transmit porting status data received via communications link 182 to the porting data store 118 via the communications link 177. Alternatively or additionally, the port status component 144 may transmit porting status data received via communications link 182 to the port information broadcast component 115 via the communications link 185. The port status component 114 may also, or instead, notify the porting monitoring system 140 and/or the enterprise operations system 130 (e.g., directly or using communications interface component 111) of porting status data and/or that one or more port status queries have been generated and/or transmitted. Any such notifications from the port statis component 114 may include the porting status data and/or data enabling the recipient component of system to retrieve such port status data from the porting data store 118.

The port information broadcast component 115 may be configured to provide porting status information to one or more systems, for example, that may be external to the volume porting system 110. For example, the port information broadcast component 115 may determine whether all porting requests associated with a particular account have been completed (e.g., all numbers associated with that account have been ported) based on port status data received from the port status component 114 and/or retrieved from the porting data store 118. If so, the port information broadcast component 115 may generate and transmit a notification of the successful account porting to the enterprise operations system 130, the porting monitoring system 140, and/or the destination operations system 150 (e.g., via communications link 142 and/or using communications interface component 111). In other examples, the port information broadcast component 115 may determine that a particular number has been successfully ported and may, in response, generate and transmit a notification of the successful number porting to the enterprise operations system 130, the porting monitoring system 140, and/or the destination operations system 150 (e.g., via communications link 142 and/or using communications interface component 111). A notification of a successful porting generated and transmitted by the port information broadcast component 115 may include number data, such as new number data (e.g., number data after porting the number to the destination network) that will allow traffic for the number to be routed to the destination network. The port information broadcast component 115 may also take one or more actions to propagate information to other networks so that traffic may be routed to a ported number via a new destination network. The port information broadcast component 115 may also, or instead, transmit notifications of completed but failed porting operations failed (e.g., final attempts to port have been made were unsuccessful) for particular numbers and/or accounts to the enterprise operations system 130, the porting monitoring system 140, and/or the destination operations system 150 (e.g., via communications link 142 and/or using communications interface component 111).

The communications interface component 111 may be configured to provide or otherwise facilitate communications with systems and components outside of the volume porting system 110. For example, the communications interface component 111 may communicate with one or more other systems on behalf of (e.g., in response to communications requests received from) the number data collection component 112, the port processing component 113, the port status component 114, and/or the port information broadcast component 115, for example using application programing interfaces (APIs). The communications interface component 111 may also provide an interface to data stored at the porting data store 118. Alternatively or additionally, the communications interface component 111 may provide data used to implement communications between the components of the volume porting system 110 and other systems (e.g., APIs from a library maintained at the communications interface component 111).

As noted, the porting data store 118 may store any data associated with the porting operations described herein and/or that may be used by any of the components of the volume porting system 110. The porting data store 118 may functionally be any one or more of a data store, a data grid, a database, or other data storage means that may store any one or more data structures of any type. The porting data store 118 may be accessible by any of the components of the volume porting system 110. The porting data store 118 may serve as a means to exchange information between such components.

The volume porting system 110 and/or any one or more the components associated therewith may each represent one or more physical and/or logical resources, such as one or more server computers, software resources, databases, data storage resources, data processing resources such as virtual machine (VM) instances, networking resources, data communication resources, network services, other types of resources, or any combination thereof. In various examples, the volume porting system 110 and/or portions thereof may be implemented in one or more a cloud information storage and processing systems. In examples, the volume porting system 110 and/or portions thereof may also, or instead, be implemented in dedicated physical resources, such as one or more physical servers and/or computing systems configured to perform the operations described herein.

Illustrative Signal Flows

Figure 2:
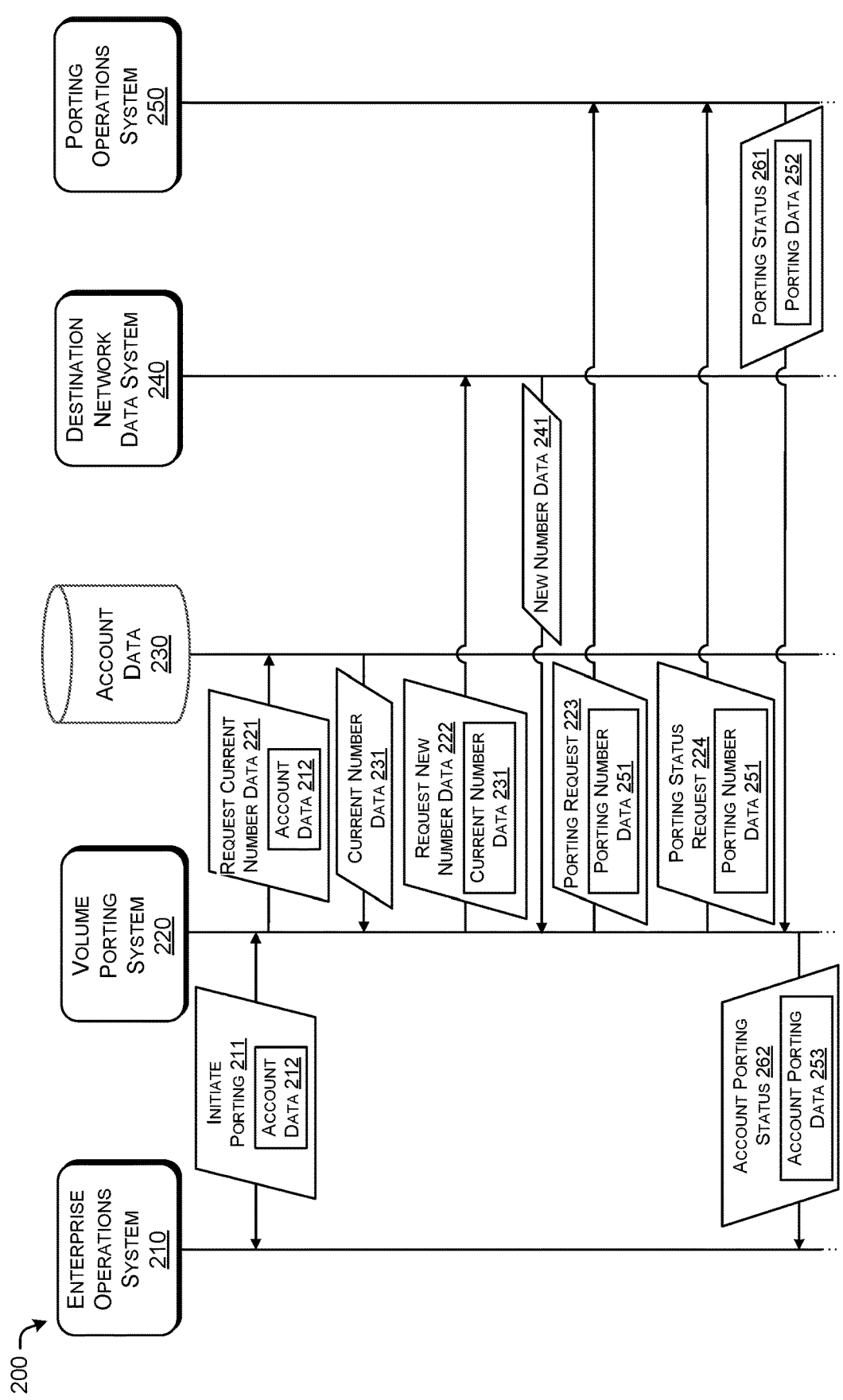
FIG. 2 is a schematic diagram of illustrative functions and communications that may be implemented in a wireless communications network and associated components in which systems and methods for volume porting may be implemented, in accordance with examples of the disclosure.
Figure 3:
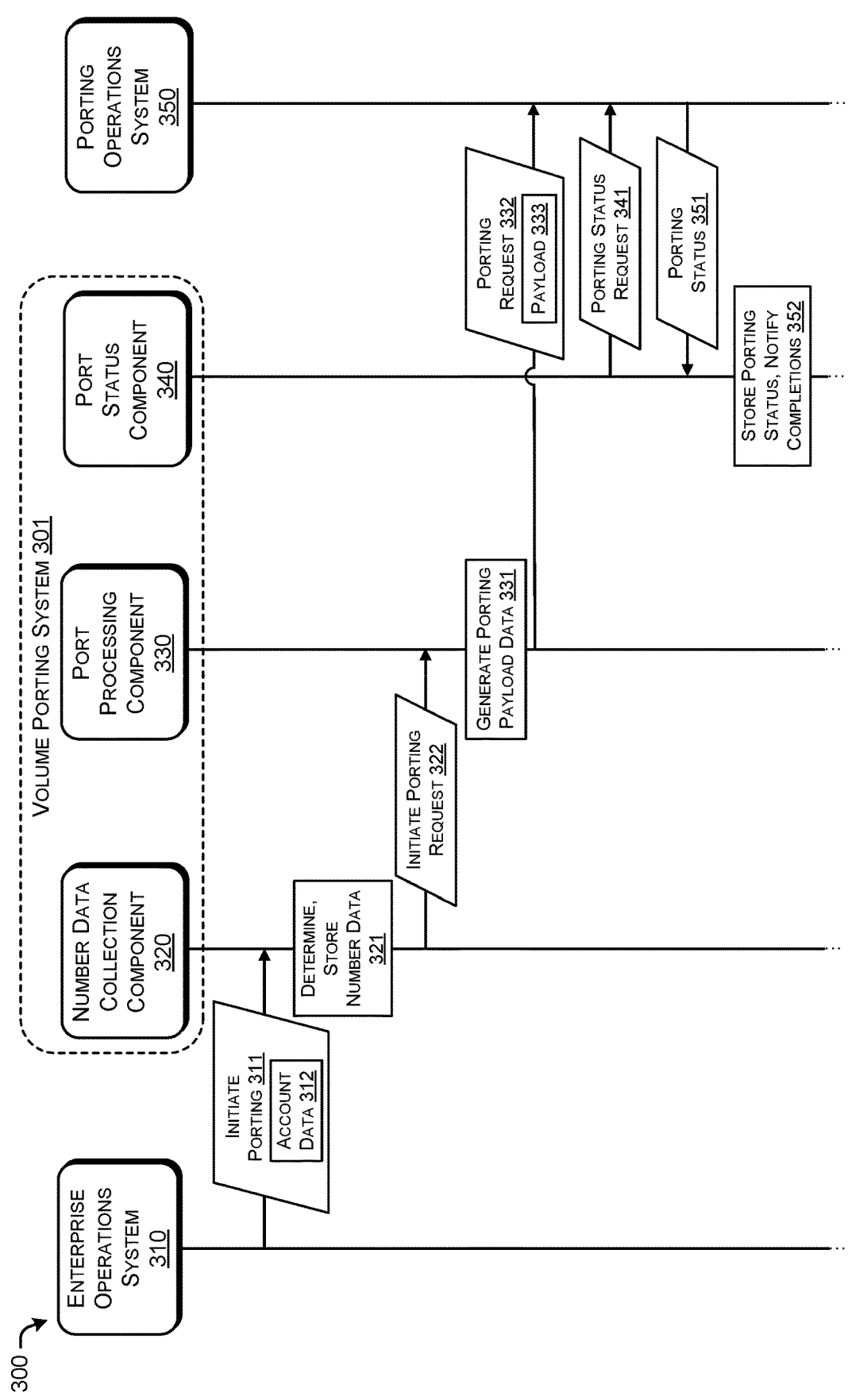
FIG. 3 is a schematic diagram of illustrative functions and communications that may be implemented in a wireless communications network and associated components in which systems and methods for volume porting may be implemented, in accordance with examples of the disclosure.

FIGS. 2 and 3 illustrate exemplary signal flows 200 and 300 of various messages that may be exchanged and operations that may be performed in one or more of the disclosed systems and techniques for performing volume porting operations as described herein. Reference may be made in this description of the exemplary functions, communications, messages, components, systems, and/or operations illustrated in FIG. 1 and described in regard to that figure. However, the functions and communications illustrated in FIGS. 2 and 3 and described herein may be implemented in any suitable system and/or with any one or more suitable devices and/or entities. Moreover, any of the functions and communications described in regard to FIGS. 2 and 3 may be used or separately and/or in conjunction with other functions and communications and/or implemented using any devices, systems, and or operations. All such embodiments are contemplated as within the scope of the instant disclosure.

Signal flow 200 of FIG. 2 represents an exemplary signal flow of messages that may be used to request and perform various operations related to the porting of one or more numbers and to determine status of porting requests. An enterprise operations system 210 (e.g., enterprise operations system 130 of FIG. 1) may request 211 that a volume porting system 220 initiate porting for an account associated with account data 212. In various examples, message 211 may be transmitted from the enterprise operations system 210 to the volume porting system 220. In other examples, the volume porting system 220 may poll or otherwise query the enterprise operations system 210 for porting events. The message 211 may include the account data 212 and/or an indication of such data (e.g., a pointer or information that may be used to retrieve the account data 212). Alternatively or additionally, the volume porting system 220 may query the enterprise operations system 210 for the account data 212, which may be responsively provided. In another nonlimiting example, the volume porting system 220 may retrieve the account data 212 from the enterprise operations system 210 and/or from another system (e.g., a billing system, legacy or current account data system, etc.).

The volume porting system 220 may transmit message 221, that may include at least a subset of the account data 212, to the account data store 230 to request current number data associated with the account represented by the account data 212. For example, the account data 212 may indicate an account owner, account number, and/or other account data but may not necessarily represent all telephone numbers associated with the account. Moreover, account data 212 may not include current number data for the numbers associated with the account (e.g., current BAN data). Because porting of a telephone number may require additional information beyond just the telephone number itself, the volume porting system 220 may transmit message 221 requesting current number data for one or more (e.g., all) numbers associated with the account represented by account data 212. The account data store 230 may provide the current number data 231 associated with the account data 212 to the volume porting system 220.

The volume porting system 220 may transmit message 222, that may include at least a subset of the current number data 231, to a destination network data system 240 to request new number data representing the number data that is to be associated with the numbers associated with the account represented by the account data 212 by the porting operation(s). For example, in a porting operations, the number data associated with a particular number may be updated so that the number may be associated with a different (new) primary network. Therefore, the number data for the number may be updated with number data (e.g., new BAN data) associated with the new primary network. As noted, the porting of a telephone number may require additional information beyond just the telephone number itself. In examples, the current and new number data may be used by a porting operations system to port a number. Thus, the volume porting system 220 may transmit message 222 requesting new (ported) number data for one or more (e.g., all) numbers associated with the current number data 231. The destination network data system 240 may provide the new number data 241 associated with the current number data 231 to the volume porting system 220.

The volume porting system 220 may aggregate or otherwise determine the porting number data 251 that may be used by a porting operations system 250 to port one or more of the numbers associated with the account data 212. For example, the porting operations system 250 may use all or any subset of the new number data 241 and/or the current number data 231 to determine the porting number data 251. The volume porting system 220 may transmit a porting request 223 with the porting number data 251 to the porting operations system 250 requesting porting of the one or more numbers represented in the porting number data 251. In various examples, the porting request 224 may request porting of a single number, and therefore the porting number data 251 may be data associated with a single number, while in other examples, the porting request 224 may request the porting of multiple numbers, and therefore the porting number data 251 may be data associated with such multiple numbers.

The volume porting system 220 may transmit a porting status request 224 to the porting operations system 250 with at least a portion of the porting number data 251 requesting a status of the porting request 223 and/or of the porting operations for the number(s) associated with the porting number data 251. Alternatively or additionally, the porting status request 224 may be more general, for example, requesting unreported porting statuses and/or porting status data for ports requests in a particular time period or since a particular time in the past.

The porting operations system 250 may respond to the request 224 with a porting status message 261. This message 261 may include porting data 252 that may indicate one or more statuses for one or more porting operations and/or associated number data. In examples, this data 252 may include data associated with numbers represented in the porting number data 251 provided to the porting operations system 250 in the porting request 223. The data 252 may also, or instead, include indications of other numbers and/or statuses, for example, where the porting operations system 250 is configured to provide more general status information, such as all ports performed in a time period, since a particular time in the past, etc.

The volume porting system 220 may generate and transmit an account porting status message 262 to the enterprise operations system 210 that may include account porting data 253. For example, the volume porting system 220 may determine that all numbers for the account associated with the account data 212 have been successfully ported (e.g., based on porting data 252 received from the porting operations system 250) and may in turn report the porting results as account porting data 253 in message 262 transmitted to the enterprise operations system 210. Alternatively or additionally, the message 262 may report the status of porting an individual number and/or may report statuses other than successfully completed ports of one or more numbers (e.g., "failed," "in progress," "incomplete," "terminated," etc.).

Signal flow 300 of FIG. 3 represents an exemplary signal flow of messages that may be exchanged by components of a volume porting system 301 to perform porting operations and to determine status of such operations. The volume porting system 301 may include a number data collection component 320, a porting processing component 330, and/or a port status component 340, as well as other components that may be configured in and/or associated with a volume porting system as described herein. In some examples, the volume porting system 301 may be a porting system similar to the volume porting system 110 and may be configured with similar components.

An enterprise operations system 310 (e.g., enterprise operations system 130 of FIG. 1) may request 311 that a volume porting system 301 initiate porting for an account associated with account data 312. In various examples, message 311 may be transmitted from the enterprise operations system 310 to the number data collection component 320 of the volume porting system 301. In other examples, the number data collection component 320 may poll or otherwise query the enterprise operations system 310 for porting events. In various examples, the number data collection component 320 may detect porting events at the enterprise operations system 310 using any means. The message 311 may include the account data 312 and/or an indication of such data (e.g., a pointer or information that may be used to retrieve the account data 312). Alternatively or additionally, the number data collection component 320 may query the enterprise operations system 310 for the account data 312, which may be responsively provided. In another nonlimiting example, the number data collection component 320 may retrieve the account data 312 from the enterprise operations system 310 and/or from another system (e.g., a billing system, legacy or current account data system, etc.).

At operation 321, the number data collection component 320 may determine number data associated with the account data 312. For example, the number data collection component 320 may determine all numbers associated with the account represented by the account data 312. The number data collection component 320 may further determine the current and future (post-port) number data beyond the telephone numbers (e.g., BAN data) for the numbers associated with the account represented by the account data 312. Further at operation 321, the number data collection component 320 may store this number data at a porting data store as described herein for access by the port processing component 330.

The number data collection component 320 may transmit a request 322 to initiate porting operations to the port processing component 330. This message 322 may include an indication that the number data is available for the requested porting operations at a porting data store. Alternatively or additionally, the number data collection component 320 may transmit the number data within the request 322.

At operation 331, the port processing component 330 may generate a payload for a porting request, for example, based on the number data. The operation 331 may include retrieving such number data and/or determining a subset of such number data to be provided to a porting operations system 350 for performing porting operations.

The port processing component 330 may transmit this payload data within payload 333 with a porting request 332 to the porting operations system 350. As described herein, the port processing component 330 may also store and/or otherwise provide notifications to one or more other components (e.g., the port status component 340, a porting monitoring system, an enterprise system, etc.) that a porting request has been submitted to the porting operations system 350. This notifications and/or associated data may include any subset of the number data associated with and/or used to generate the porting request.

The port status component 340 may transmit a request 341 for porting status to the porting operations system 350. The request 341 may be generated in response to a notification or detection of data associated with the porting request 332 and/or may more generally be a request for porting status (e.g., for recent porting requests, unreported porting statuses, porting status for porting requests received during a particular time period, etc.).

The porting operations system 350 may respond to the porting status request 341 with port status message 351 that may provide a status of porting operations performed for one or more numbers specifically associated with the porting status request 341 and/or for numbers associated with a more general porting status request (e.g., for numbers recent for which porting requests were recently received, numbers for which porting status has not yet been reported, porting status for numbers for which porting requests were received in a particular time period, etc.).

At operation 352, the port status component 340 may determine and store porting status data based on the porting status message 351. In various examples, the port status component 340 may provide this data, or indicate the storage of this data, to other components, such as a port information broadcast component, an enterprise operations system, a porting monitoring system, etc. The port status component 340 and/or one or more other components may further determine at operation 352 whether to report one or more porting statuses. For example, the port status component 340 and/or one or more other components of the volume porting system 301 may determine whether an account has been successfully ported or completely ported (e.g., all numbers associated with the account have been successfully ported or all attempts to port such numbers have been completed) and, if so, may notify one or more other systems as described herein.

Illustrative Processes

Figure 4:
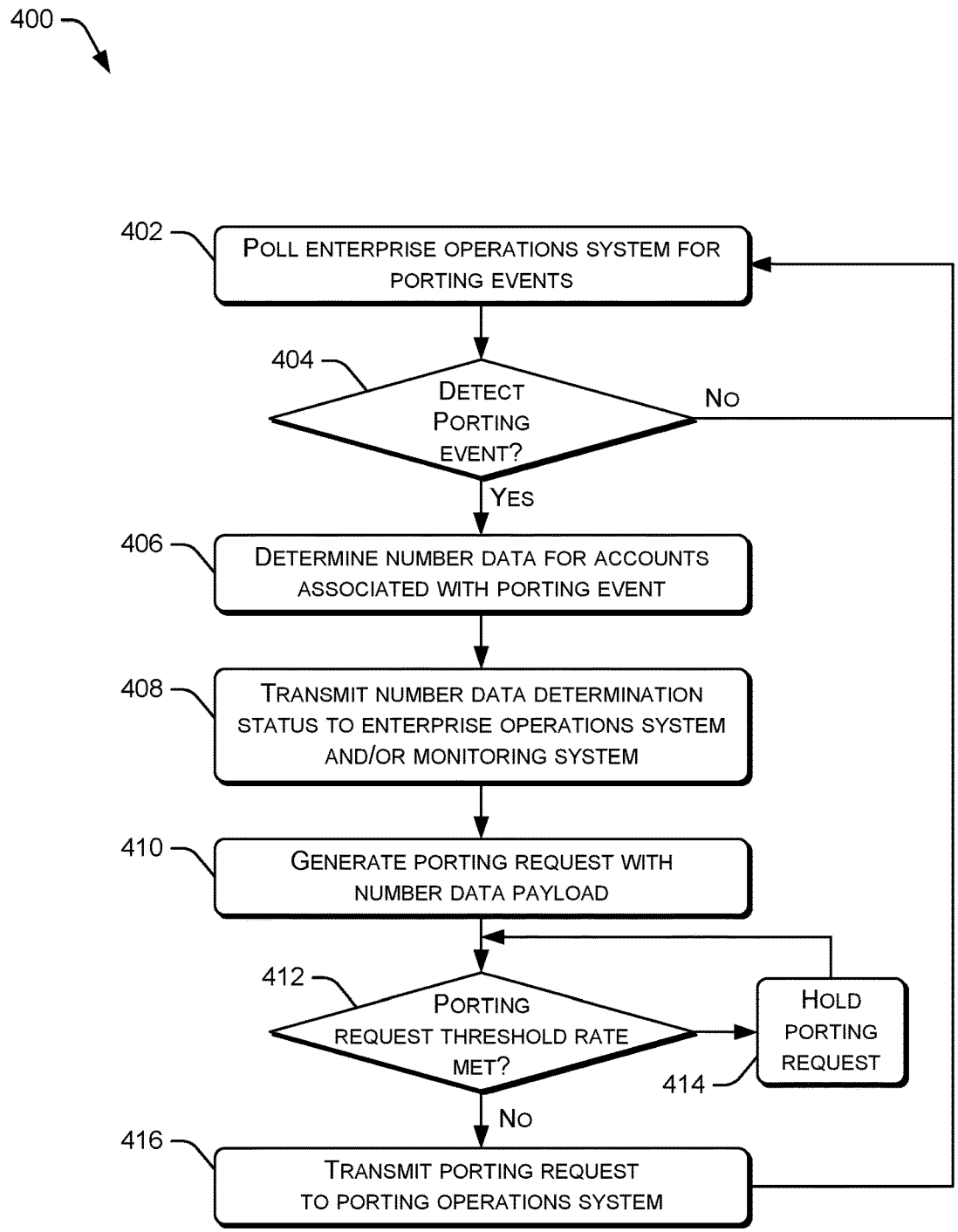
FIG. 4 is a flow diagram of an illustrative process for volume porting, in accordance with examples of the disclosure.
Figure 5:
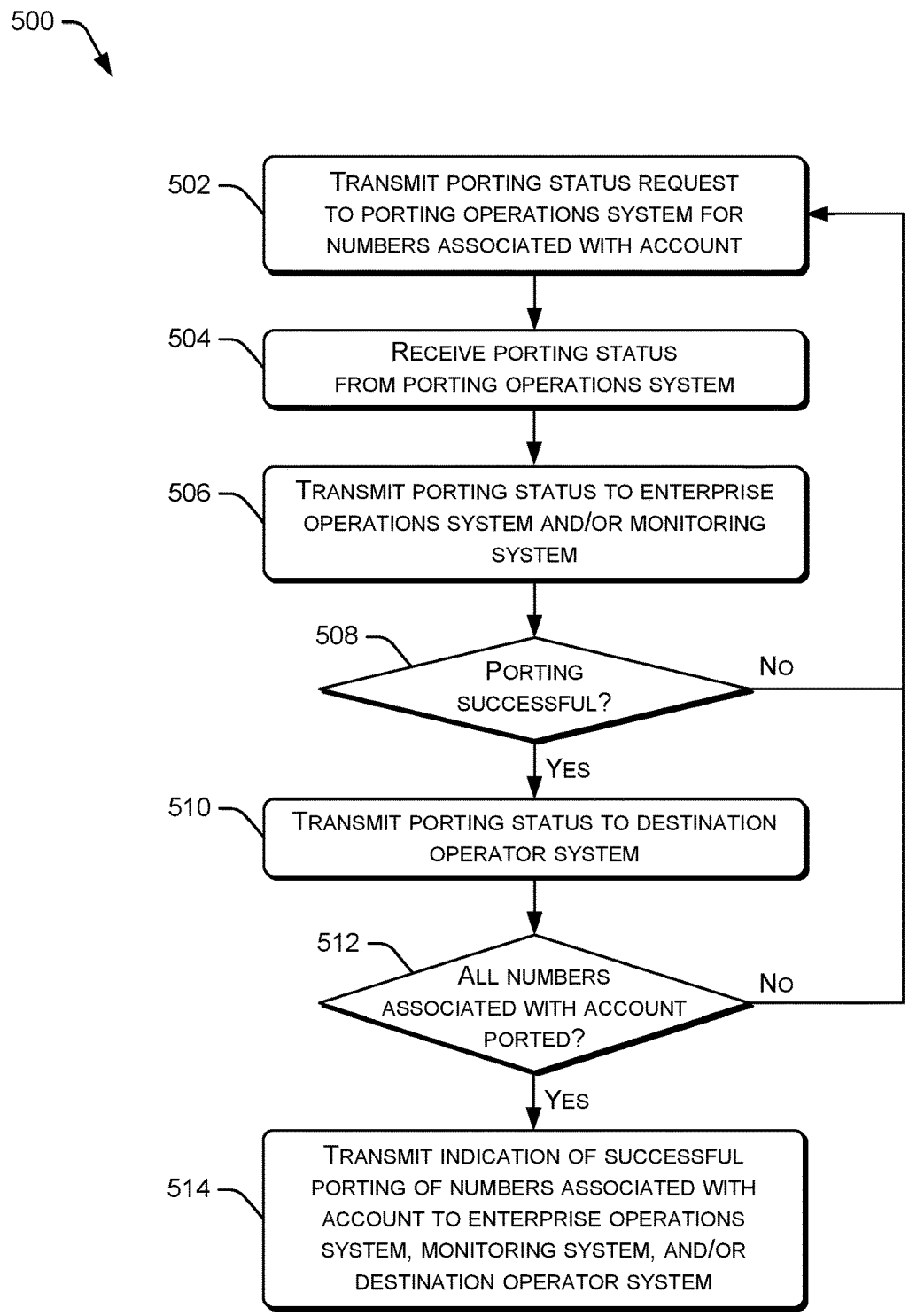
FIG. 5 is a flow diagram of another illustrative process for volume porting, in accordance with examples of the disclosure.
Figure 6:
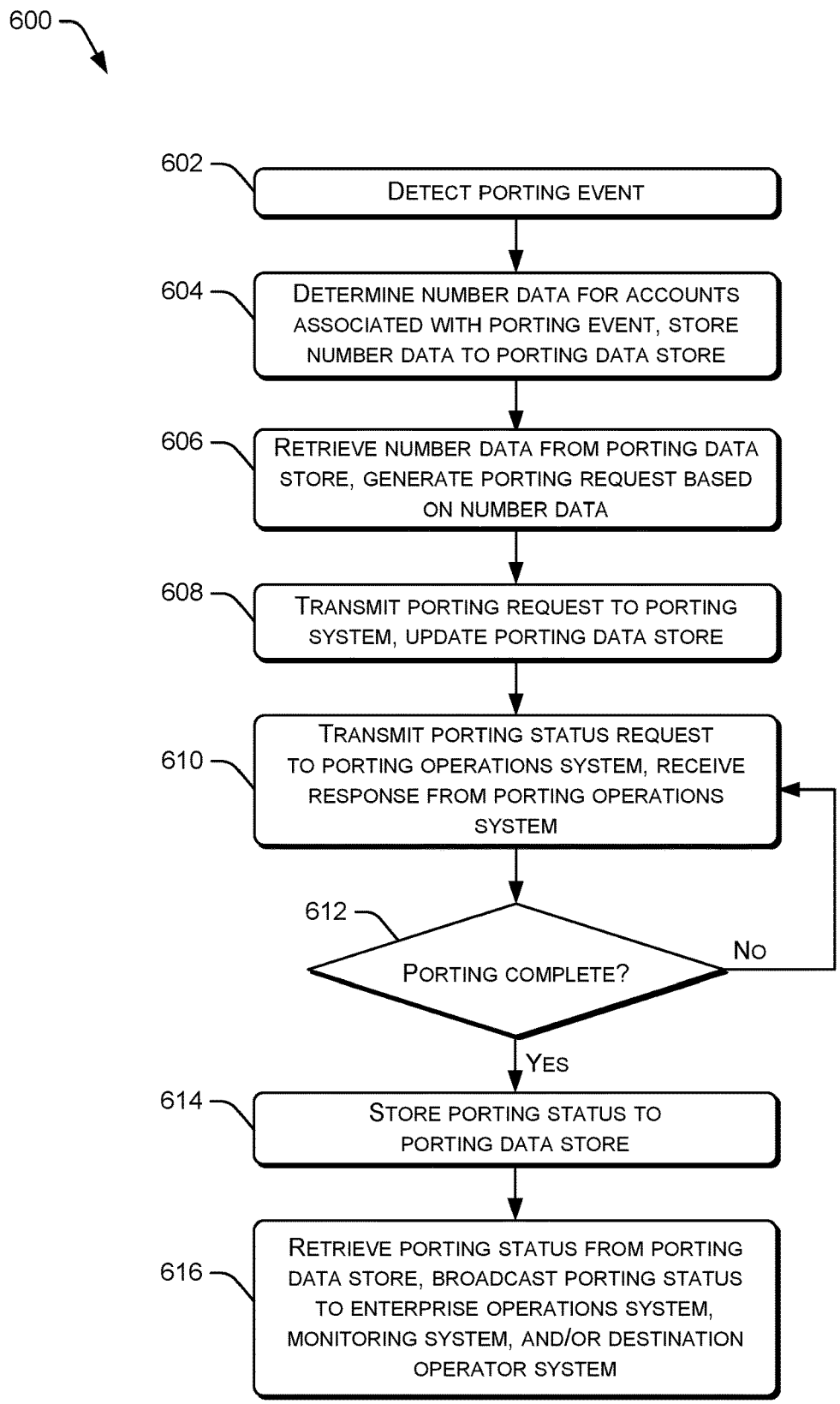
FIG. 6 is a flow diagram of another illustrative process for volume porting, in accordance with examples of the disclosure.

FIGS. 4-6 show flow diagrams of illustrative processes 400, 500, and 600 for volume porting according to the disclosed embodiments. These processes are illustrated as collections of blocks in logical flow diagrams, each of which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the processes 400, 500, and 600 may be described with reference to the environment 100 of FIG. 1 and/or components and systems illustrated therein; however, other environments, systems, and components may also be used.

Referring to process 400 of FIG. 4 for generating and transmitting a porting request, at operation 402, a volume porting system may poll an enterprise operations system for porting events. For example, a component of a volume porting system (e.g., a number data collection component) may periodically query an enterprise operations system for porting events. Alternatively or additionally, the enterprise operations system may transmit a notification to a volume porting system (e.g., to a number data collection component) indicating a porting event.

At operation 404, the volume porting system (e.g., the number data collection component of such a system) may determine whether a porting event has been detected or otherwise indicated. If not, the process 400 may return to operation 402.

If a porting event have been detected, at operation 406 the volume porting system (e.g., the number data collection component) may determine number data for one or more accounts associated with the porting event. For example, as described herein, the number data collection component of a volume porting system may retrieve or otherwise determine current and future (post-port) number data (e.g., BAN data) for one or more (e.g., all) numbers associated with each account associated with the porting event (e.g., from a current account data store, destination network data system, etc.). The volume porting system (e.g., the number data collection component) may also, at operation 406, notify one or more systems (e.g., porting monitoring system, enterprise operations system, etc.) that a porting event has been detected.

At operation 408, the volume porting system (e.g., the number data collection component) may transmit the status of the number data determinations performed at operation 406 to one or more systems (e.g., a port processing component of the volume porting system, porting monitoring system, enterprise operations system, etc.). For example, the number data collection component may store the determined number data at a data store and transmit an indication of the determined number data to a port processing system so that the port processing system may initiate porting operations with an external porting operations system and/or one or more other systems. The number data collection component may also, or instead, determine that number data was not successfully retrieved and/or validated and may notify such systems accordingly.

At operation 410, the volume porting system (e.g., the port processing component) may retrieve the number data stored at operation 406 and/or received at operation 408 and determine porting request payload data based on such number data. For example, the port processing component may assemble or otherwise determine a request payload using a subset of current and new number data and generate a porting request at operation 410 that is intended for a porting operations system that includes this payload.

Because a porting operations system may be configured to receive porting requests at a limited rate and/or because the volume porting system may be configured to transmit porting requests at a limited rate, at operation 412, the volume porting system (e.g., the port processing component) may determine whether a threshold rate of porting requests have been met. For example, the volume porting system may be configured to transmit no more than 100 porting requests in a particular time period (e.g., per second, per minute, etc.). At operation 412, the volume porting system may determine if 100 requests have been transmitted in the current time period. If a threshold rate has been met, the process 400 may move to operation 414 where the porting request generated at operation 410 may be held until the next time period for transmission to the porting operations system.

If the threshold rate of porting request transmissions has not been met, at operation 416, the volume porting system (e.g., the port processing component) may transmit the request generated at operation 410 to the porting operations system.

Referring now to process 500 of FIG. 5 for determining a status of a porting request, at operation 502, a volume porting system (e.g., a port status component) may transmit a porting status request to a porting operations system. This request may include one or more number and/or number data. Alternatively or additionally, this request may request porting status for porting requests sent to the porting operations system during a particular time period. Alternatively or additionally, this request may request porting status for porting requests for which the porting operations system has not yet provided status. The volume porting system (e.g., the port status component) may also update one or more systems (e.g., a porting monitoring system, enterprise operations system, etc.) that a porting status request has been sent to the porting operations system.

At operation 504, the volume porting system (e.g., the port status component) may receive status data from the porting operations system. This status data may include the current status of one or more porting requests and associated number data. The volume porting system (e.g., the port status component) may store this status data and/or data representative thereof at a porting data store. At operation 506, the volume porting system (e.g., the port status component) may transmit the received status data and/or indications thereof to a port information broadcast component of the volume porting system, a porting monitoring system and/or an enterprise operations system.

At operation 508, the volume porting system (e.g., the port status component and/or the port information broadcast component) may determine if one or more number ports have been successfully completed. If so, at operation 510, the volume porting system (e.g., the port status component and/or the port information broadcast component) may transmit an indication of the successful number port to a destination operator system, for example, alerting the destination operator system that it is now serving as a primary network for the numbers associated with the successful ports.

If, at operation 510, the volume porting system (e.g., the port status component and/or the port information broadcast component) determines that one or more numbers for which porting has been requested have not (e.g., yet) been successfully ported, the process may return to operation 502 to continue to monitor status responses from the porting operations system. In examples, a final status associated with a condition other than successful porting may be associated with a particular number (e.g., porting failed and no further porting attempts will be made based on the associated porting request). In such cases, the volume porting system (e.g., the port status component and/or the port information broadcast component) may notify one or more systems (e.g., a porting monitoring system and/or an enterprise operations system) but may not notify the destination operator system as that system is not responsible for routing traffic for the particular number since the porting of that number to the destination network failed.

At operation 512, the volume porting system (e.g., the port status component and/or the port information broadcast component) may determine whether porting has been successful for an account (e.g., for all numbers associated with the account). If not, the process 500 may return to operation 502 to continue to monitor status responses from the porting operations system.

If all numbers associated with an account have been successfully ported, the account may be determined to be successfully ported at operation 512. In response, at operation 514, the volume porting system (e.g., the port information broadcast component) may transmit an indication of successful account porting to one or more of a porting monitoring system, an enterprise operations system, and/or a destination network operator system (e.g., destination network billing system, destination network account system, etc.).

Referring now to process 600 of FIG. 6 for performing operations at a volume porting system to port one or more numbers associated with an account, at operation 602, a porting even may be detected at a component of such a volume porting system. For example, a number data collection component may detect or otherwise determine a porting event that may be associated with one or more accounts.

At operation 604, the number data collection component may determine number data for the one or more accounts associated with the event. As described herein, multiple accounts may be associated with an event and/or multiple telephone numbers may be associated with an individual account. Moreover, number data other than a telephone number may be used to perform porting operations for such a telephone number. Therefore, at operation 604, a number data collection component may obtain, retrieve, or otherwise determine number data (e.g., current and future (post-port) BAN data) for a telephone number via interactions with one or more of various data sources and systems (e.g., current or legacy account data stores, destination network data systems, etc.) as described herein. Further at operation 604, the number data collection component may store the determined number data at a porting data store for access by one or more other components of the volume porting system and transmit a notification to a port processing component that number data is available. Alternatively or in addition, at operation 604 the number data collection component may transmit at least a portion of such determined number data to one or more other components of the volume porting system.

At operation 606, the number data may be retrieved from the porting data store by the port processing component in response to receiving a notification of available number data from the number data collection component or otherwise detecting available number data. For example, rather than responding to notifications, the port processing component may poll or query a porting data store (e.g., periodically) to determine if there is new available number data and, if so, may responsively obtain such data at operation 606. Further at operation 606, the port processing component may generate a porting request based on this number data.

At operation 608, the port processing component may transmit the porting request to a porting operations system. The port processing may also, at this operation, update the porting data store with data representing and/or otherwise associated with the porting request. The port processing may also, or instead, transmit a notification of the porting request to another component, such as the port status component. Such a notification may include porting request data and/or indicate that porting request data is available at the porting data store.

At operation 610, the port status component may transmit a request for porting status to the porting operations system. The port status component may perform this operation in response to receiving a notification from the port processing component that a porting request has been submitted to the porting operations system and/or detecting a new porting request on the porting data store. Alternatively or additionally, the port status component may be configured to periodically transmit a request for porting status to the porting operations system. Further at operation 610, the port status component may receive porting status data from the porting operations system. The port status component may store this data and/or data representative thereof at the porting data store. The port status component may also, or instead, transmit a notification of receiving porting status data (that may or may not include the received porting status data) to one or more other systems or components (e.g., a porting monitoring system, enterprise operations system, etc.).

At operation 612, the port status component may determine whether the status data received from the porting operations system indicates that porting for a particular number is complete. If not, the process 600 may return to operation 610 to resume status queries.

If the porting for a number is complete, at operation 614 the port status component may store that porting status to the porting data store and/or may alert one or more other systems that the porting is complete for that number. For example, the port status component may transmit a notification to a port information broadcast component that porting is complete for that number.

At operation 616, the port information broadcast component may retrieve or otherwise determine the completed porting data for the number and determine whether to notify various other systems and components. For example, the port information broadcast component may determine that the ported number is one of multiple numbers associated with an account and that there is at least one other number associated with the account that is not yet ported. Based on this determination, the port information broadcast component may notify a porting monitoring system, an enterprise operations system, and a destination network operation system that the number has been successfully ported, but not that the account has been ported. Alternatively, the port information broadcast component may determine that all numbers associated with an account have been successfully ported and may notify one or more systems that the numbers and the account have been ported.

In summary, by more efficiently determining number data, generating porting requests, and determining porting status, the disclosed systems and techniques may be able to increase the efficiency of porting volumes of numbers between wireless networks and therefore improve the performance of both the network and systems involved in performing porting operations.

Example User Equipment

Figure 7:
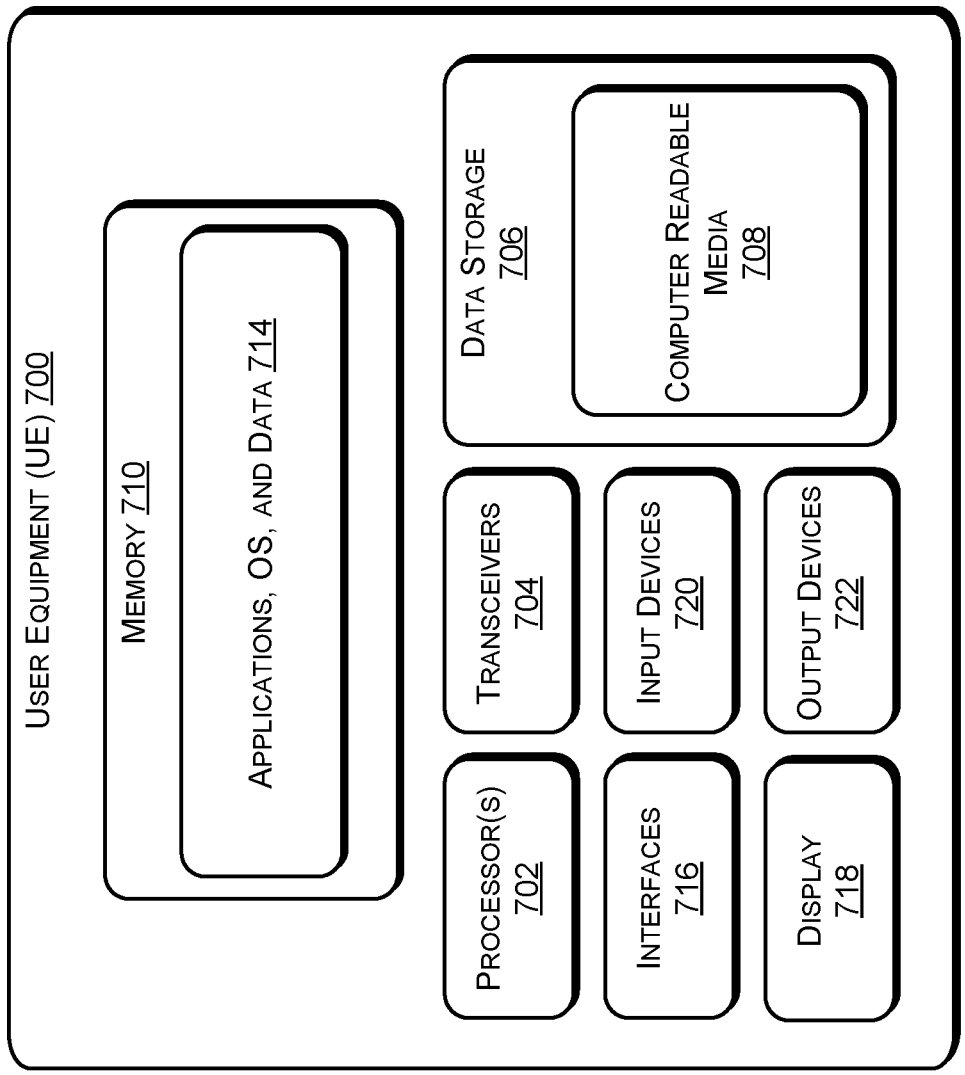
FIG. 7 is a schematic diagram of illustrative components in an example user device that is configured for interacting with a wireless communications network that implements volume porting, in accordance with examples of the disclosure.

FIG. 7 is an example of a user equipment (UE) 700 for use with the systems and methods disclosed herein, in accordance with some examples of the present disclosure. For example, the UE may be associated with a number and BAN data that may be ported from one network to another as described herein. The UE 700 may include one or more processors 702, one or more transmit/receive antennas (e.g., transceivers or transceiver antennas) 704, and a data storage 706. The data storage 706 may include a computer readable media 708 in the form of memory and/or cache. The data storage 706 and/or the computer readable media 708 may store wireless network operational data, such as BAN data. This computer-readable media may include a non-transitory computer-readable media. The processor(s) 702 may be configured to execute instructions, which can be stored in the computer readable media 708 and/or in other computer readable media accessible to the processor(s) 702. In some configurations, the processor(s) 702 is a Central Processing Unit (CPU), a Graphics Processing Unit (GPU), or both CPU and GPU, or any other sort of processing unit. The transceiver antenna(s) 704 can exchange signals with a base station (e.g., eNodeB, gNodeB, etc.).

The UE 700 may be configured with a memory 710. The memory 710 may be implemented within, or separate from, the data storage 706 and/or the computer readable media 708. The memory 710 may include any available physical media accessible by a computing device to implement the instructions stored thereon. For example, the memory 710 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 700.

The memory 710 can store several modules, such as instructions, data stores, and so forth that are configured to execute on the processor(s) 702. In configurations, the memory 710 may also store one or more applications 714 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., an eNodeB or gNodeB). The applications 714 may also include one or more operating systems and/or one or more third-party applications that provide additional functionality to the UE 700. The memory may also, or instead, store bandwidth information, such as UE supported bands, bandwidth(s) and bandwidth parts, BAN data, as well as communications session information such as UE specific carrier bandwidth(s).

Although not all illustrated in FIG. 7, the UE 700 may also comprise various other components, e.g., a battery, a charging unit, one or more network interfaces 716, an audio interface, a display 718, a keypad or keyboard, and one or more input devices 720, and one or more output devices 722.

Example Computing Device

Figure 8:
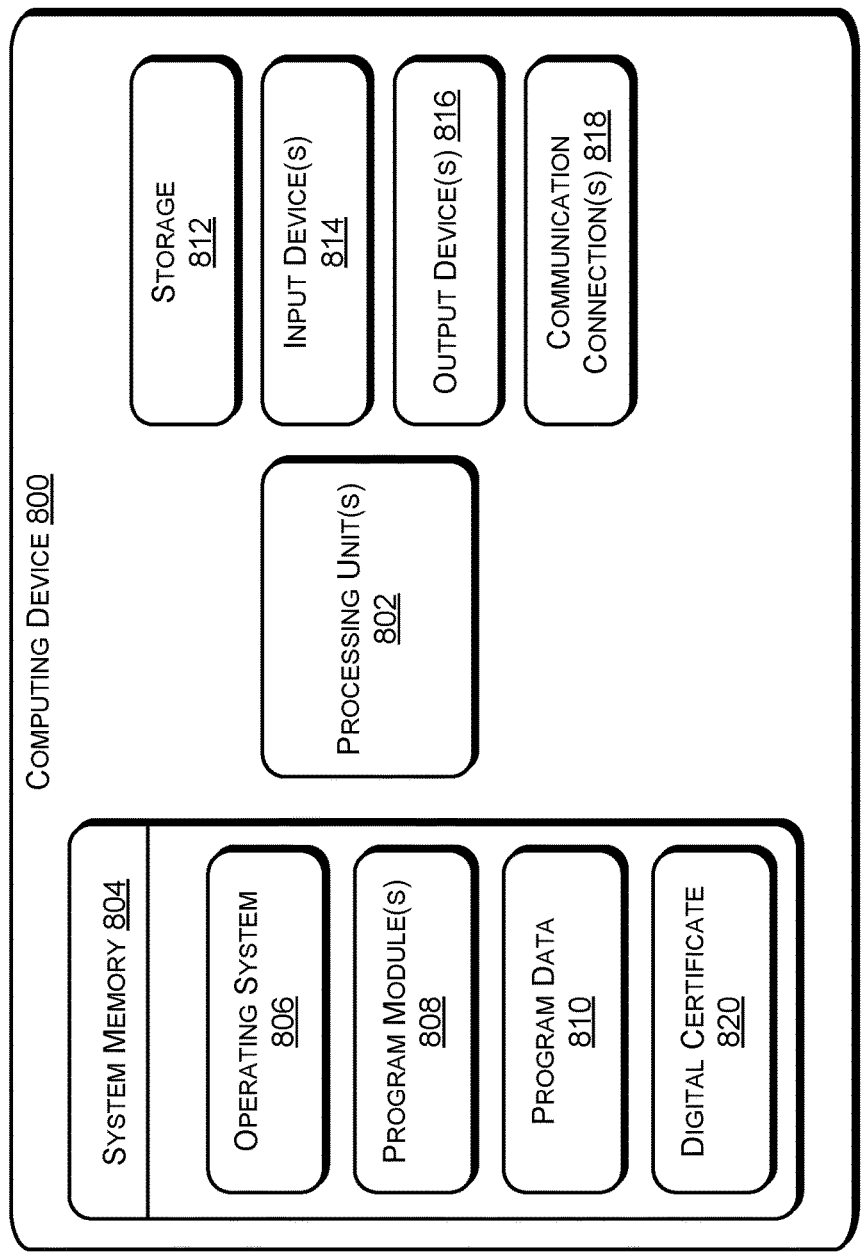
FIG. 8 is a schematic diagram of illustrative components in an example computing device that is configured for performing one or more aspects of volume porting, in accordance with examples of the disclosure.

FIG. 8 is an example of a computing device 800 for use with the systems and methods disclosed herein, in accordance with some examples of the present disclosure. The computing device 800 can be used to implement various components of a volume porting system, such as one or more of a number data collection component, a port processing component, a port status component, a port information broadcast component, a communications interface component, and a porting data store component. The computing device 800 can be used to implement various components of a wireless communications network, include a core network, a base station (e.g., gNodeB or eNodeB), and/or any servers, routers, gateways, gateway elements, administrative components, etc. that can be used by a communication provider. One or more computing devices 800 can be used to implement the systems and components in environment 100 of FIG. 1, for example. One or more computing devices 800 can also be used to implement base stations and other wireless network components.

In various embodiments, the computing device 800 can include one or more processing units 802 and system memory 804. Depending on the exact configuration and type of computing device, the system memory 804 can be volatile (such as RAM), nonvolatile (such as ROM, flash memory, etc.) or some combination of the two. The system memory 804 can include an operating system 806, one or more program modules 808, program data 810, and one or more digital certificates 820. The system memory 804 may be secure storage or at least a portion of the system memory 804 can include secure storage. The secure storage can prevent unauthorized access to data stored in the secure storage. For example, data stored in the secure storage can be encrypted or accessed via a security key and/or password.

The computing device 800 can also include additional data storage devices (removable and/or non-removable) such as, for example, magnetic disks, optical disks, or tape. Such additional storage is illustrated in FIG. 8 by storage 812.

The computing device 800 may store, in either or both of the system memory 804 and the storage 812, number data, include BAN data, account data, porting data, porting request data, porting status data, and/or any other data associated therewith.

Non-transitory computer storage media of the computing device 800 can include volatile and nonvolatile, removable and non-removable media implemented in any method or technology for storage of information, such as computer readable instructions, data structures, program modules, or other data. The system memory 804 and storage 812 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 800. Any such non-transitory computer readable storage media can be part of the computing device 800.

In various embodiment, any or all of the system memory 804 and storage 812 can store programming instructions which, when executed, implement some or all of the functionality described above as being implemented by one or more systems configured in the environment 100 and/or components of such systems.

The computing device 800 can also have one or more input devices 814 such as a keyboard, a mouse, a touch-sensitive display, voice input device, etc. The computing device 800 can also have one or more output devices 816 such as a display, speakers, a printer, etc. can also be included. The computing device 800 can also contain one or more communication connections 818 that allow the device to communicate with other computing devices using wired and/or wireless communications.

EXAMPLE CLAUSES

The following paragraphs describe various examples. Any of the examples in this section may be used with any other of the examples in this section and/or any of the other examples or embodiments described herein.

A: A method performed by a one or more computing devices configured in a wireless communications network, the method comprising: detecting, at a telephone number data collection component of a volume porting system, a porting event associated with a wireless communications account; determining, by the telephone number data collection component, one or more telephone numbers associated with the wireless communications account; determining, by the telephone number data collection component, current billing account number data and ported billing account number data for the one or more telephone numbers; transmitting, from a port processing component of the volume porting system to a porting operations system, a request to port a telephone number of the one or more telephone numbers, the request comprising a payload based at least in part on the current billing account number data and the ported billing account number data; transmitting, from a port status component of the volume porting system to the porting operations system, a porting status query associated with the telephone number; receiving, at the port status component from the porting operations system, porting status data associated with the telephone number; determining, by a port information broadcast component of the volume porting system and based at least in part on the porting status data, that the telephone number has been successfully ported; and transmitting, from the port information broadcast component to a destination network operations system, an indication that the telephone number has been successfully ported.

B: The method of paragraph A, further comprising: storing, by the telephone number data collection component, the current billing account number data and the ported billing account number data at a porting data store; and transmitting, from the telephone number data collection component to the port processing component, an indication of the current billing account number data and the ported billing account number data at the porting data store, wherein transmitting the request to port the telephone number comprises retrieving, by the port processing component based at least in part on the indication of the current billing account number data and the ported billing account number data, from the porting data store.

C: The method of paragraph A or B, further comprising: determining, by the port information broadcast component that a plurality of telephone numbers associated with the wireless communications account has been successfully ported; and transmitting, from the port information broadcast component to the destination network operations system, an indication that the wireless communications account has been successfully ported.

D: The method of any of paragraphs A-C, further comprising: storing, by the port status component, the porting status data at a porting data store; and transmitting, from the port status component to the port information broadcast component, an indication of the porting status data at the porting data store, wherein determining that the telephone number has been successfully ported comprises retrieving, by the port information broadcast component and based at least in part on the indication of the porting status data, the porting status data from the porting data store.

E: The method of any of paragraphs A-D, wherein transmitting the request to port the telephone number comprises determining, by the port processing component, that a current rate of transmission of requests to port telephone numbers is below a threshold rate of transmission.

F: The method of any of paragraphs A-E, wherein the payload comprises a current service profile identifier (SPID) and a ported SPID.

G: A network computing device configured at a wireless communications network, the network computing device comprising: one or more processors; one or more transceivers; and non-transitory computer-readable media storing computer-executable instructions that, when executed by the one or more processors, cause the one or more processors to perform operations comprising: detecting a porting event associated with a wireless communications account; determining a telephone number associated with the wireless communications account; determining number data associated with the telephone number; generating a porting request comprising a payload based at least in part on the number data; transmitting the porting request to a porting operations system; transmitting a porting status query comprising a subset of the number data to the porting operations system; receiving porting status data from the porting operations system; determining a porting status for the telephone number based at least in part on the porting status data; and based at least in part on the porting status, transmitting an indication of the porting status to one or more systems.

H: The network computing device of paragraph G, wherein: determining the porting status comprises determining that the telephone number has been successfully ported; and transmitting the indication of the porting status to the one or more systems comprises transmitting the indication of the porting status to a destination network operations system.

I: The network computing device of paragraph G or H, wherein: determining the porting status comprises determining that the telephone number has not been successfully ported; and transmitting the indication of the porting status to the one or more systems comprises transmitting the indication of the porting status to a system that is not a destination network operations system.

J: The network computing device of any of paragraphs G-I, wherein determining the number data comprises determining billing account number data for the telephone number.

K: The network computing device of any of paragraphs G-J, wherein the billing account number data comprises one or more of a service profile identifier (SPID) or a local routing number (LRN).

L: The network computing device of any of paragraphs G-K, wherein the billing account number data comprises current billing account number data and ported billing account number data.

M: The network computing device of any of paragraphs G-L, wherein transmitting the porting request to the porting operations system comprises transmitting a plurality of porting requests to the porting operations system at a rate of request transmission that is at or below a threshold rate of request transmission.

N: The network computing device of any of paragraphs G-M, wherein detecting the porting event comprises polling an enterprise operations system to detect one or more porting events.

O: A non-transitory computer-readable media storing computer-executable instructions that, when executed by one or more processors, cause the one or more processors to perform operations comprising: detecting a porting event associated with a telephone number; determining billing account number data associated with the telephone number; generating a porting request comprising a payload based at least in part on the billing account number data; transmitting the porting request to a porting operations system; transmitting a porting status query comprising a subset of the number data to the porting operations system; receiving porting status data from the porting operations system; determining a porting status for the telephone number based at least in part on the porting status data; and based at least in part on the porting status, transmitting an indication of the porting status to one or more systems.

P: The non-transitory computer-readable media of paragraph O, wherein detecting the porting event comprises receiving an indication of the porting event from an enterprise operations system.

Q: The non-transitory computer-readable media of paragraph O or P, wherein transmitting the porting request to the porting operations system causes the porting operations system to update a number portability administration component based at least in part on the billing account number data.

R: The non-transitory computer-readable media of any of paragraphs O-Q, wherein transmitting the porting request to the porting operations system comprises: determining that a rate of porting request transmission is at or below a threshold rate of porting request transmission; and based at least in part on determining that the rate of porting request transmission is at or below the threshold rate of porting request transmission, transmitting the porting request to the porting operations system.

S: The non-transitory computer-readable media of any of paragraphs O-R, wherein the operations further comprise: determining a second porting status for a second telephone number based at least in part on the porting status data; determining an account porting status for a wireless communications account associated with the telephone number and the second telephone number based at least in part on the porting status and the second porting status; and based at least in part on the account porting status, transmitting an indication of the account porting status to one or more systems.

T: The non-transitory computer-readable media of any of paragraphs O-S, wherein: the account porting status indicates that all telephone numbers associated with the account have been successfully ported; and transmitting the indication of the account porting status to one or more systems comprises transmitting the indication of the account porting status to a destination network billing system.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal (DSP), an application specific integrated circuit (ASIC), a field processor programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured in a wireless communications network, the method comprising:
   detecting, at a telephone number data collection component of a volume porting system, a porting event;
   determining, by the telephone number data collection component, telephone numbers associated with the wireless communications accounts;
   determining, by the telephone number data collection component, current billing account number data and ported billing account number data for the telephone numbers, wherein the current billing account number data includes at least service profile identifiers (SPIDs) and local routing numbers (LRNs) for the telephone numbers;
   transmitting, from a port processing component of the volume porting system to a porting operations system, a request to port at least a plurality of the telephone numbers, the request comprising a payload determined based at least in part on the current billing account number data and the ported billing account number data for the plurality of telephone numbers;
   transmitting, from a port status component of the volume porting system to the porting operations system, a porting status query associated with the telephone numbers;
   receiving, at the port status component from the porting operations system, porting status data associated with the telephone numbers;
   determining, by a port information broadcast component of the volume porting system and based at least in part on the porting status data, that the telephone numbers have been successfully ported; and transmitting, from the port information broadcast component to a destination network operations system, an indication that the telephone numbers have been successfully ported.

2. The method of claim 1, further comprising:

storing, by the telephone number data collection component, the current billing account number data and the ported billing account number data at a porting data store; and transmitting, from the telephone number data collection component to the port processing component, an indication of the current billing account number data and the ported billing account number data at the porting data store, wherein transmitting the request to port the telephone numbers comprises retrieving, by the port processing component based at least in part on the indication of the current billing account number data and the ported billing account number data, from the porting data store.

3. The method of claim 1, further comprising:

determining, by the port information broadcast component that telephone numbers associated with a particular one of the wireless communications accounts have been successfully ported; and transmitting, from the port information broadcast component to the destination network operations system, an indication that the particular one of the wireless communications accounts has been successfully ported.

4. The method of claim 1, further comprising:

storing, by the port status component, the porting status data at a porting data store; and transmitting, from the port status component to the port information broadcast component, an indication of the porting status data at the porting data store, wherein determining that the telephone numbers have been successfully ported comprises retrieving, by the port information broadcast component and based at least in part on the indication of the porting status data, the porting status data from the porting data store.

5. The method of claim 1, wherein transmitting the request to port the telephone numbers comprises determining, by the port processing component, that a current rate of transmission of requests to port telephone numbers is below a threshold rate of transmission.

6. The method of claim 1, wherein the payload comprises the current service profile identifiers (SPIDs) and ported SPIDs for the plurality of telephone numbers.

7. A network computing device configured at a wireless communications network, the network computing device comprising:

one or more processors;
one or more transceivers; and
non-transitory computer-readable media storing computer-executable instructions that, when executed by the one or more processors, cause the one or more processors to perform operations comprising:

detecting a porting event associated with wireless communications accounts;
determining telephone numbers associated with the wireless communications accounts;
determining current number data and ported number data associated with the telephone numbers, wherein the current number data includes at least service profile identifiers (SPIDs) and local routing numbers (LRNs) for the telephone numbers;
generating a porting request comprising a payload determined based at least in part on the current number data and the ported number data;
transmitting the porting request to a porting operations system;
transmitting a porting status query comprising at least a subset of the current number data or the ported number data to the porting operations system;
receiving porting status data from the porting operations system;
determining a porting status for the telephone numbers based at least in part on the porting status data; and
based at least in part on the porting status, transmitting an indication of the porting status to one or more systems.

8. The network computing device of claim 7, wherein:

determining the porting status comprises determining that the telephone numbers have been successfully ported; and transmitting the indication of the porting status to the one or more systems comprises transmitting the indication of the porting status to a destination network operations system.

9. The network computing device of claim 7, wherein:

determining the porting status comprises determining that the telephone numbers have not been successfully ported; and transmitting the indication of the porting status to the one or more systems comprises transmitting the indication of the porting status to a system that is not a destination network operations system.

10. The network computing device of claim 7, wherein determining the current number data comprises determining current billing account number data for the telephone number.

11. The network computing device of claim 10, wherein the ported number data comprises one or more of SPIDs or LRNs.

12. The network computing device of claim 7, wherein transmitting the porting request to the porting operations system comprises transmitting a plurality of porting requests to the porting operations system at a rate of request transmission that is at or below a threshold rate of request transmission.

13. The network computing device of claim 7, wherein detecting the porting event comprises polling an enterprise operations system to detect one or more porting events.

14. A non-transitory computer-readable media storing computer-executable instructions that, when executed by one or more processors, cause the one or more processors to perform operations comprising:

detecting a porting event associated with telephone numbers;
determining current billing account number data and ported billing account number data associated with the telephone numbers, wherein the current number data includes at least service profile identifiers (SPIDs) and local routing numbers (LRNs) for the telephone numbers;
generating a porting request comprising a payload determined based at least in part on the current billing account number data and the ported billing account number data;
transmitting the porting request to a porting operations system;

transmitting a porting status query comprising at least subset of the current billing account number data or the ported billing account number data to the porting operations system;

receiving porting status data from the porting operations system;

determining a porting status for the telephone numbers based at least in part on the porting status data; and based at least in part on the porting status, transmitting an indication of the porting status to one or more systems.

15. The non-transitory computer-readable media of claim 14, wherein detecting the porting event comprises receiving an indication of the porting event from an enterprise operations system.

16. The non-transitory computer-readable media of claim 14, wherein transmitting the porting request to the porting operations system causes the porting operations system to update a number portability administration component based at least in part on the current billing account number data or the ported billing account number data.

17. The non-transitory computer-readable media of claim 14, wherein transmitting the porting request to the porting operations system comprises:

determining that a rate of porting request transmission is at or below a threshold rate of porting request transmission; and based at least in part on determining that the rate of porting request transmission is at or below the threshold rate of porting request transmission, transmitting the porting request to the porting operations system.

18. The non-transitory computer-readable media of claim 14, wherein the operations further comprise:

determining an account porting status for the wireless communications accounts based at least in part on the porting status; and based at least in part on the account porting status, transmitting an indication of the account porting status to one or more systems.

19. The non-transitory computer-readable media of claim 18, wherein:

transmitting the indication of the account porting status to one or more systems comprises transmitting the indication of the account porting status to a destination network billing system.

* * * * *